(12) United States Patent
Cai (10) Patent No.: US 11,818,796 B1
(45) Date of Patent: Nov. 14, 2023

(54) DISTRIBUTED COMPUTING ACROSS A WIRELESS COMMUNICATIONS NETWORK

(71) Applicant: T-Mobile Innovations LLC, Overland Park, KS (US)

(72) Inventor: Zheng Cai, Fairfax, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 84 days.

(21) Appl. No.: 17/383,196

(22) Filed: Jul. 22, 2021

(51) Int. Cl.
*H04W 8/24* (2009.01)
*H04W 76/10* (2018.01)
*H04W 24/08* (2009.01)

(52) U.S. Cl.
CPC ............. *H04W 8/24* (2013.01); *H04W 24/08* (2013.01); *H04W 76/10* (2018.02)

(58) Field of Classification Search
CPC ........ H04W 8/24; H04W 76/10; H04W 24/08
USPC .......................................................... 370/329
See application file for complete search history.

(56) References Cited

U.S. PATENT DOCUMENTS

| | | | | |
|---|---|---|---|---|
| 9,756,547 | B2 * | 9/2017 | Egner ................. | H04W 64/003 |
| 11,076,016 | B1 * | 7/2021 | Alfano ................ | H04L 67/568 |
| 2015/0055608 | A1 * | 2/2015 | Egner ................. | H04W 4/025 370/329 |
| 2015/0207686 | A1 * | 7/2015 | Raleigh ................ | H04L 63/08 370/329 |
| 2020/0178085 | A1 * | 6/2020 | Ertimo ................ | H04W 16/18 |
| 2021/0175945 | A1 * | 6/2021 | Chen .................. | H04B 7/0639 |
| 2022/0038926 | A1 * | 2/2022 | Kim .................... | H04W 72/56 |
| 2022/0078650 | A1 * | 3/2022 | Lee .................... | H04W 72/0446 |
| 2022/0116908 | A1 * | 4/2022 | Chun .................. | H04W 76/27 |
| 2022/0132622 | A1 * | 4/2022 | Ahn .................... | H04W 88/06 |

FOREIGN PATENT DOCUMENTS

CN 107466482 A * 12/2017 ........... G06F 9/5072

* cited by examiner

*Primary Examiner* — Mong-Thuy T Tran
(74) *Attorney, Agent, or Firm* — SHOOK, HARDY & BACON L.L.P.

(57) ABSTRACT

A method for distributing computations across a network is described. The method includes determining a computational-need condition. Then one or more used devices may be selected based at least in part on status and reporting messages, and a computational capacity of the user equipment. The user equipment is instructed to perform a computational task to meet the computational-need condition. The user equipment will send a computational result upon completion of the computational task. A node will then implement the computational result so as to at least partially meet the computational-need condition.

19 Claims, 6 Drawing Sheets

DISTRIBUTED COMPUTING ACROSS A WIRELESS COMMUNICATIONS NETWORK

SUMMARY

The present disclosure is directed, in part, to utilizing the advanced processors on modern smartphones (and other user equipment) across a wireless communications network. These modern smartphones, such as those configured to operate on 5G, for example, include these advanced processors to perform computationally intensive tasks. Base stations and distributed stations of the wireless communications network may also have various computationally intensive tasks to perform. Some of these base stations and distributed stations may include less-advanced processors and/or have a computational-need condition in other situations. Aspects herein may meet this computational-need condition at least in part by utilizing the advanced processor(s) one or more smartphones.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter of aspects herein is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
3GPP Third-Generation Partnership Project
4G Fourth-Generation Cellular Communication System
5G Fifth-Generation Cellular Communication System
CD-ROM Compact Disk Read Only Memory
CDMA Code Division Multiple Access
eNodeB Evolved Node B
ETSI European Telecommunications Standards Institute
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more base stations to provide wireless access to a network. For example, in a wireless telecommunication network, a plurality of access points, each providing service for a cell or a sector of a cell, are used to transmit and receive wireless signals to/from one or more UEs. An access point may be considered to be one or more otherwise-discrete components comprising an antenna, a radio, and/or a controller, and may be alternatively referred to as a "node," in that it is a point of origin for the communication link between the wired and wireless portions of the communication system. In aspects, a node may be defined by its ability to communicate with a UE according to a single protocol (e.g., 3G, 4G, LTE, 5G, and the like); however, in other aspects, a single node may communicate with a UE according to multiple protocols.

As used herein, the terms "cell" or "node" may be specific nodes, base stations, or access points that can be considered to be discrete from one another. While cells and nodes may be referred to herein with respect to its protocol, it should be understood that any particular cell or node may be capable of operating in any one or more of any suitable wireless communication protocol, using any one or more frequencies, frequency bands, channels, and the like. The terms "user device," "user equipment," "UE," "mobile device," "mobile handset," and "mobile transmitting element" may be used interchangeably in this description.

Accordingly, a first aspect of the present disclosure is directed to a system comprising a processor and one or more non-transitory computer readable storage devices. The storage devices store computer-executable instructions that, when executed by the processor, cause the processor to perform a method. The method includes establishing communication with a user equipment; receiving, from the user equipment, a reporting message indicative of a computing capacity of the user equipment; monitoring a status of the user equipment; determining an computational-need condition; determining, based at least in part on the status and the reporting message, a computational capacity of the user equipment; instructing the user equipment to perform a computational task to meet the computational-need condition; receiving, from the user equipment, a computational result; and implementing the computational result so as to at least partially meet the computational-need condition.

A second aspect of the present disclosure is directed to a method of distributed computation. The method may include establishing communication with a user equipment via mobile broadband, and receiving a reporting message indicative of a computing capacity of the user equipment. A status of the user equipment may be monitored. The method may further include determining a computational-need condition, as well as a computational capacity of the user equipment, based at least in part on the status and the reporting message. The method may then include instructing the user equipment to perform a computational task to at least partially meet the computational-need condition. Upon completion, a computational result may be received from the user equipment. The computational result may then be implemented so as to at least partially meet the computational-need condition.

A third aspect of the present disclosure is directed to a system comprising: processor and one or more non-transitory computer readable storage devices storing computer-executable instructions that, when executed by the processor, cause the processor to perform a method. The processor may establish communication with a first user equipment and a second user equipment. The processor may receive, from the first user equipment, a first reporting message indicative of a first computing capacity of the first user equipment; and receive, from the second user equipment, a second reporting message indicative of a second computing capacity of the second user equipment. The processor may monitor a first status of the first user equipment and a second status of the second user equipment. The processor may determine a computational-need condition. The processor may determine, based at least in part on the first status and the first reporting message, a computational capacity of the first user equipment; as well as determine, based at least in part on the second status and the second reporting message, a computational capacity of the second user equipment. The processor may instruct the first user equipment to perform a computational task to meet the computational-need condition. Upon completion, the processor may receive, from the first user equipment, a computational result; and implement the computational result so as to at least partially meet the computational-need condition.

According to another aspect of the technology described herein, a system may include a base station and a user equipment in communication with the base station. The base station and the user equipment may each perform one or more of the steps described herein. According to yet another aspect of the technology described herein, a non-transitory computer readable storage medium having a computer program stored thereon. When executed by one or more processors, the computer program instructs the one or more processors to perform one or more of the steps described herein.

Figure 1:
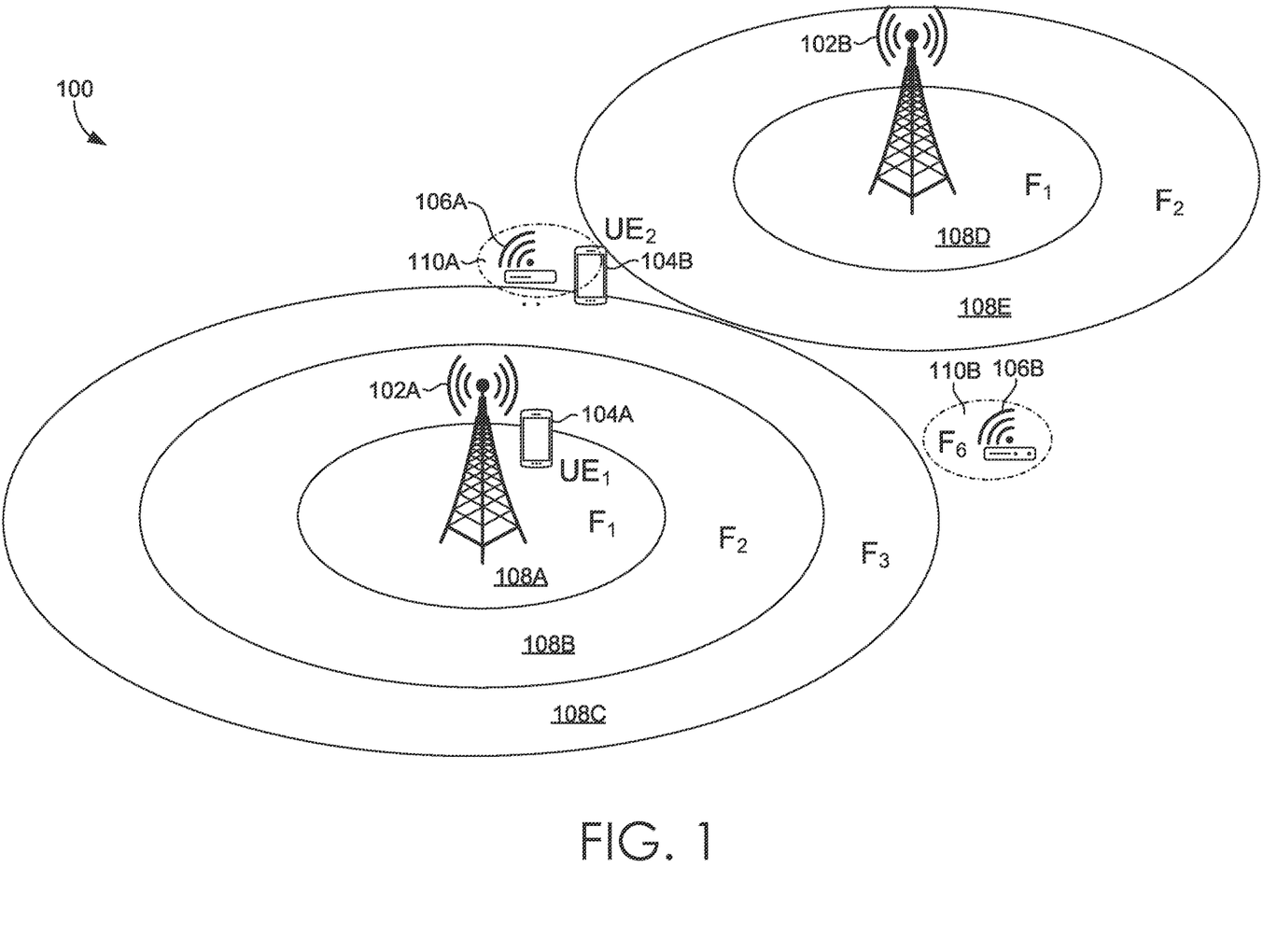
FIG. 1 is a diagram of a wireless communications network in which one or more aspects of the present disclosure may be carried out.

Referring to FIG. 1, a diagram of a wireless communications network 100 in which one or more aspects of the present disclosure may be carried out is depicted. The diagram may illustrate one or more features and an example environment for embodiments of the present disclosure. Wireless communications network 100 is shown as having a number of components and associated devices therein. The wireless communications network 100 includes base stations 102 (shown as 102A and 102B in FIG. 1). Base station 102 communicates with one or more UEs 104 (shown as 104A and 104B in FIG. 1) that are disposed within a coverage range of the base station 102. The wireless communications network 100 may also include one or more distributed stations 106 (shown as 106A and 106B in FIG. 1) that may be partially or fully within the coverage area of the base station 102. The base station 102 projects one or more frequency regions 108 (shown as 108A-C associated with base station 102A and 108D-E associated with base station 102B in FIG. 1) that include at least a portion of a band including one or more frequencies that the UE 104 may use to communicate with the base station 102. Similarly, the distributed stations 106 may also project a distributed frequency region 110 (shown as 110A and 110B in FIG. 1).

Wireless communications network 100 may be a 5G network, a 4G network, or other telecommunications network. The wireless communications network 100 facilitates communication between the UEs 104 and an external computing device, via the base station 102 and/or the distributed stations 106. The wireless communications network 100 may facilitate phone calls, text messages, Internet access, and/or other communications.

The base station 102 and/or distributed station 106 may assist the UE 104 in accessing the wireless communications network 100. This connection to the wireless communications network 100 may be described in the ETSI 125-136 series, the 3GPP 25/36 series specifications, the ETSI 138 series, and/or the 3GPP 38 series specifications. In some embodiments, this connection to the wireless communications network 100 may be described in another or a yet-to-be established (such as 6G) specification. The base station 102 and/or distributed station 106 may assist the UE 104 by providing network-selection assistance data to the UE 104. The network-selection assistance data is indicative of a recommended frequency or frequencies that the base station 102 recommends for the UE 104.

The UE 104 may also be referred to as a user device, a cell phone, a smart phone, or the like. The term "user equipment" or "UE" may be described in the Universal Mobile Telecommunications System (UTMS) and/or the 3GPP Long Term Evolution (LTE) as any electronic device utilized directly by an end-user to communicate. Examples include a hand-help smart phone, a traditional cellular phone, a laptop computer equipped with a mobile broadband router (external or internal), a tablet computer with a mobile broadband router, etc. In some embodiments, the UE utilized in certain methods may be a modern 5G-enabled smartphone. The UE may include an advanced and/or powerful processor, such as to enable 5G communications. This advanced and/or powerful processor may have computational capacity that is available (e.g., otherwise untapped) during certain periods. Aspects may utilize the processor of the UE to accomplish computationally intensive tasks as described herein.

Distributed stations 106 may cover a relatively small geographic area with the distributed frequency region 110, compared with the frequency regions 108 of the base station 102. The distributed station 106 may be unaffiliated with the base station 102 and/or may be temporary. The distributed station 106 may also be referred to as an "unplanned cell," a "femtocell", a "pico cell," a "micro cell," a "metro cell," a "small cell," a "fixed relay," or the like. For example, a femtocell may be disposed in a home or business and provide coverage for up to 32 users in a range of up to 100 meters. As another example, a pico cell may be disposed in a large shopping mall or airport and provide coverage for up to 128 users in a range of up to 200 meters. As yet another example, a micro cell may be disposed in a large urban area to fill coverage gaps between base stations 102 and provide coverage for up to 256 users in a range of up to 1000 meters.

Especially with the implementation of 5G, unplanned and irregular placements of access nodes (including the base station 102 and the distributed stations 106) may become more common due to the impassability and limited range of the high-frequency signals. For example, the distributed stations 106 may be placed in common public areas such as restaurants and shopping malls to supplement weaker signals from a base station 102. This arrangement of base stations 102 and distributed stations 106 may be referred to as a heterogeneous network environment. Thus, aspects assist the user equipment in identifying and connecting to these distributed stations 106 in a heterogeneous network environment.

Frequency regions 108 and distributed frequency regions 110 are geographic areas covered by at least a portion of a certain frequency band. For example, frequency region F1 may be covered by a first band, frequency region F2 may be covered by a second band, distributed frequency region F3 may be covered by a third band, etc. While in FIG. 1 these frequency regions 108 and distributed frequency regions 110 are shown as ovals, in reality the frequency regions 108 and distributed frequency regions 110 often have an irregular shape due to the terrain, buildings, and other physical features in the geographic location. The frequency regions 108 and distributed frequency regions 110 are also not constant in size and shape and can change due to changing conditions such as weather, interference, and other equipment. Specifically, higher frequency 5G signals are less likely to penetrate solid objects such as walls and trees at least in part because of the nature of high-frequency electromagnetic waves. The frequency region may be considered when selecting one or more UEs for performance of a computational task, as discussed herein.

An example embodiment of the present disclosure shown in FIG. 1 will now be discussed. In this example, the base station 102A may select one or more UEs 104 to perform any of various processor-intensive tasks. UE1 104A is disposed near within frequency region 1 108A near base station 102A. UE1 104A may provide the base station 102A with information related to computational capacity and computational load on UE1 104A. This information may include processor type, memory type, current tasks, etc. The base station 102A may also receive or determine other information about the UE1 104A, such as a geographic location, speed, etc. A first set of information may be associated with a capacity of the UE 104A, 104B (e.g., computational capacity) and a second set of information may be associated with an availability of the UE 104A, 104B (e.g., a time in which the UE 104 may be available, a likelihood that the UE 104A, 104B will still be in communication with the base station 102 upon completion). Based upon one or both sets of information, the base station 102A may determine a computational need and assign that to UE1 104A. Base station 102A may provide information related to the task to UE1 104A such that UE1 may perform the task and return a result.

To continue the example, the distributed station 106A may detect and be in communication with UE2 104B. The distributed station 106A may acquire information related to the UE2 104B. The UE2 104B may be within the distributed frequency region 110A. The distributed station 106A may have less computational capacity that the base station 102A and/or may have less computational capacity than the UE2 104B. As such, the distributed station 106A may rely upon one or more UEs 104A and 104B to perform computationally intensive tasks. The distributed station 106A may acquire information related to the capacity and availability of the UE2 104B to perform the computationally intensive task.

To continue the example, UE2 104B is shown between base station 102A, base station 102B, and distributed station 106A. UE2 104B may move out of range of the respective assigning station during the computation. For example, the computationally intensive task may be assigned by distributed station 106A, having a limited geographic range. The UE2 104B may then move during the computation into range of the base station 102B. Upon completion, the UE2 104B may send the computational result to base station 102B, which will then transfer the computational result to the distributed station 106A. In another embodiment, the UE2 104B may switch or request to switch back to distributed station 106A to provide the computational result to distributed station 106A.

Figure 2:
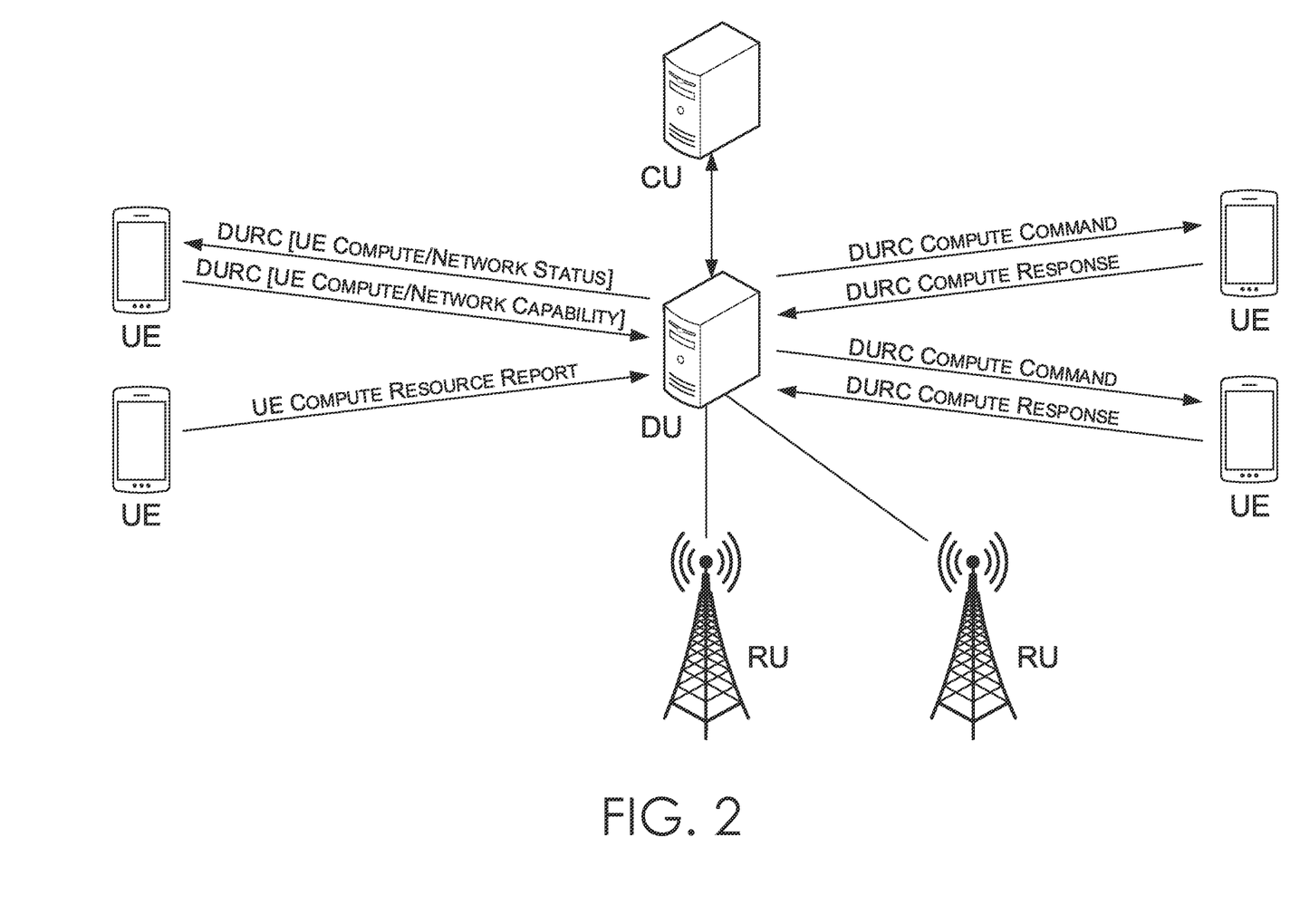
FIG. 2 is a graphical representation of an example 5G network in which one or more aspects of the present disclosure may be carried out.
Figure 4:
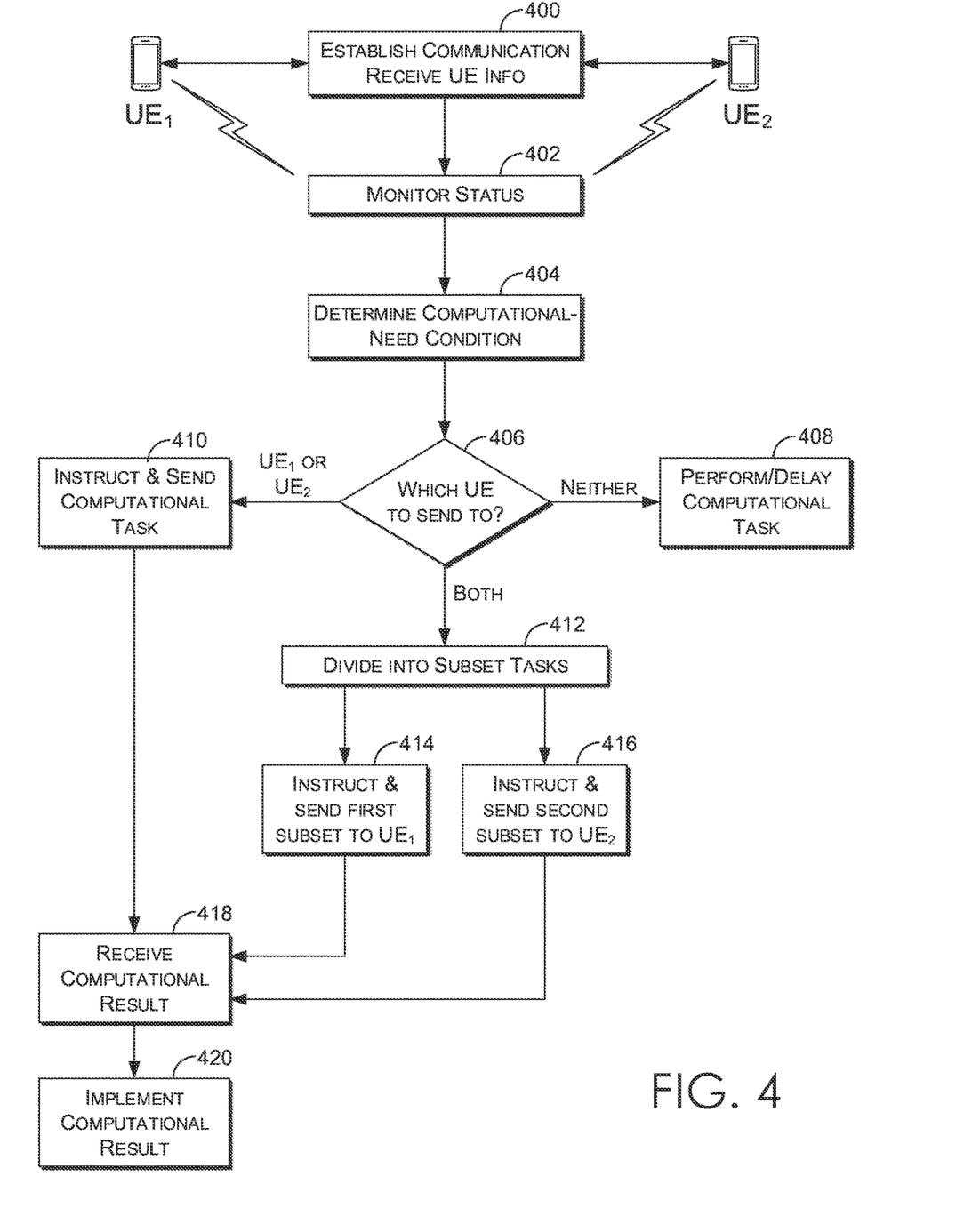
FIG. 4 is a flow diagram of one aspect of a method of distributed processing across a wireless communications network.

Referring to FIG. 2, an example embodiment of aspects herein used in an Open Radio Access Network (RAN) architecture is shown and described. Previous RAN architectures (such as 2G, 3G and 4G; an example of which is shown in FIG. 4) are at least partially monolithic, having few interactions happened between logical nodes. However, the New Radio (NR) may divide the gNB (the NR logical node) between Central Units (CUs) and Distributed Units (DUs) for increased flexibility. Flexible hardware and software implementations allow scalable, cost-effective network deployments—but only if hardware and software components are interoperable and can be mixed and matched from different vendors. A split architecture (between central and distributed units) allows for coordination for performance features, load management, real-time performance optimization and enables adaptation to various use cases and the quality of service (QoS) that needs to be supported (i.e. gaming, voice, video), which have variable latency tolerance and dependency on transport and different deployment scenarios, like rural or urban. Mobile operators may deploy a functional split architecture that openly interfaces between RU, DU and CU in some combination.

The radio unit (RU) at least partially controls the digital front end (DFE) and the parts of the physical (PHY) layer, as well as the digital beamforming functionality. The distributed unit (DU) is in close physical proximity to the RU. The UEs communicated with the DU through the RU. The DU at least partially may control the radio link control (RLC), the medium access layer (MAC), and parts of the PHY layer. This logical node includes a subset of the eNB/gNB functions, depending on the functional split option, and its operation is controlled by the CU. The centralized unit (CU) at least partially controls the Radio Resource Control (RRC) and Packet Data Convergence Control (PDCP) layers. The gNB may consist of a CU and a DU where the CUis composed of CU-UP and CU-CP via E1 interface. A CU with multiple DUs will support multiple gNBs. The split architecture enables a 5G network to utilize different distribution of protocol stacks between CU and DUs depending on midhaul availability and network design. It is a logical node that includes the gNB functions like transfer of user data, mobility control, RAN sharing (MO-RAN), positioning, session management etc., with the exception of functions that are allocated exclusively to the DU. The CU controls the operation of several DUs over the midhaul interface.

Returning to FIG. 2, an example embodiment in an Open RAN environment 200 is shown. The Open RAN environment 200 includes a centralized unit (CU) 202 communicatively coupled with a distributed unit (DU) 204. The DU 204 as illustrated is associated with a radio unit (RU) 206. The DU 204 communicates with user equipment (UE), labeled as UE1 208A and UE2 208B, via the RU 206. This is a new layer to use the UE computation resources, especially for latency critical applications so it does not need to go back to the CU as is common in existing systems.

In aspects, the DU 204 sends messages to and receives messages from the UEs 208A and 208B. As a first example, the DU 204 may send one of the UEs 208A or 208B a compute status and/or network status message, indicative of a current status of the DU 204 and/or the Open RAN network 200 generally, and/or indicative of a current computational load on the DU 204. As a second example, the UE 208A or 208B may send a compute capability or network capability status message to the DU 204, indicative of a computational capacity of the UE 208A or 208B. The compute capability status message may be sent in response to the compute status message from the DU 204. As a third example, the UE 208A or 208B may send a compute resource report to the DU 204. The compute resource report may be indicative of processing power and other attributes of the UE 208A or 208B regardless of the current capability and/or status.

In aspects herein, the DU 204 may send a compute command message to one or more UEs 208A or 208B. The compute command may instruct the UE 208 to perform one or more computationally intensive tasks. The UE 208A or 208B may then respond with a compute response message having a result or other computational result for the DU 204.

Figure 3:
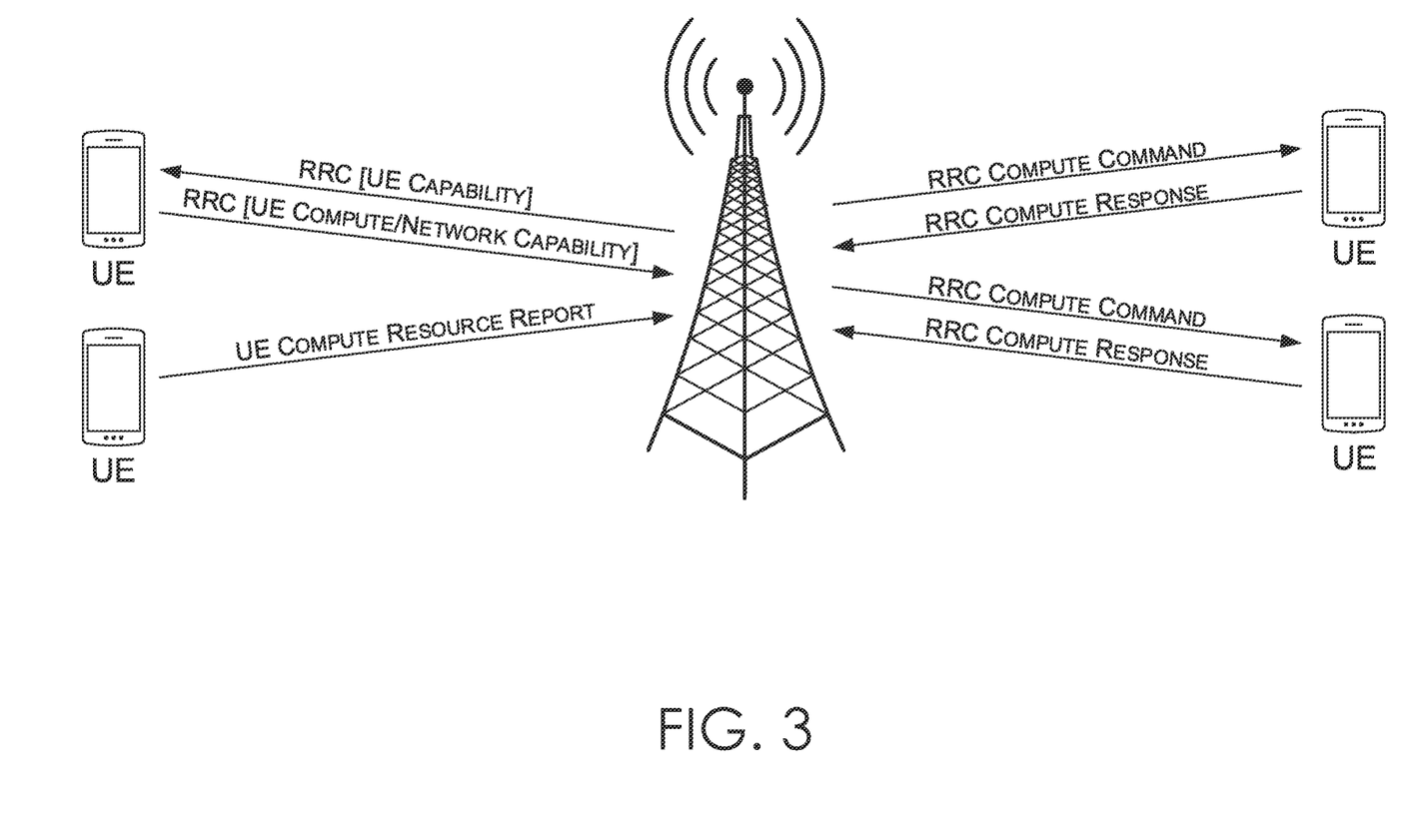
FIG. 3 is a graphical representation of an example 4G network in which one or more aspects of the present disclosure may be carried out.

FIG. 3 shows a traditional 3G/4G network 300 that may implement aspects herein. The 3G/4G network 300 has a base station 302 directly communicating with the UEs 304. As discussed above, the traditional 3G/4G does not use distributed units (DU). Similarly to the embodiment shown in FIG. 2, the base station 302 may send messages to and receive messages from the UE 304.

FIG. 4 depicts a flow diagram of an exemplary method for completing computationally intensive tasks across a communications network. Steps of the method may be performed by the UE, by a base station, by a distributed station, or by some combination thereof. The steps may also be performed in any order. Two or more steps may be performed simultaneously.

At step 400, a processor (e.g., at the base station 102 or distributed station 106 of FIG. 1) communicates with the user equipment. The communication is over a mobile communications network, such as mobile communications network 100 of FIG. 1. Information related to the computational capacity and/or computational load on the processor of the UE may be sent to the distributed station. The user equipment information is indicative of properties of the user equipment that may affect which, if any, tasks may be completed. The user equipment information may include a UE manufacturer name, a UE model name or number, a type of antenna or information about the antenna, a type of processor, an amount of non-volatile memory, an amount of volatile memory, etc. The user equipment information may include status information, such as a current operational mode of the UE, a current geographic location of the UE, a current signal strength received, a current speed and direction of travel, and other information. The user equipment information may also include historical information from the UE.

During this step, the station may receive, from the user equipment, a reporting message indicative of a computing capacity of the user equipment. Computing capacity may be indicative of at least one of the following: processing capacity, a memory storage capacity, and/or a network speed capacity. The reporting message may also be indicative of a status. The status may be indicative of a current mode of the user equipment, a current computational load, a current signal strength, a current geographic location of the user equipment, a current speed of the user equipment.

At step 402, the processor may monitor a status of the one or more UEs in communication therewith. Monitoring the status may include receiving an updated reporting message from the user equipment, determining an updated geographic location for the user equipment, determining an updated signal strength for the user equipment, etc. The processor may monitor the status so as to be able to select one or more UEs to assist upon determination of a computational-need condition (discussed below). For example, without monitoring the status, the processor may select a UE that has subsequently left the geographic range or has a diminished computational capacity due to some other computational task on the UE.

At step 404, the processor determines a computational-need condition. The computational-need condition may be based upon any of various computational needs of the processor. In some instances, the computational-need condition may be based at least in part on an increased computational task for the processor, such as based upon an increase in the number of UEs connected thereto. In some instances, the computational-need condition may be based at least in part on a new computational task assigned to the DU from the CU (as shown in FIG. 3). In some instances, the computational-need condition may be based at least in part upon a diminished computational capacity of the processor for some other reason. In some instances, the computational-need condition may be based at least in part on computational efficiency, e.g., that it would be less computationally and/or time intensive for UE to meet the need.

In some embodiments, determining the computational-need condition may include or otherwise be associated with determining a computational task for external computation. A "computational task" as used herein may be any task that is capable of being transferred from one device to another with a resultant "computational result" returned to the original device. The computational task may include data, sensor readings, databases, or other information (or information related to the identification of such information). The processor may identify one or more discrete computational tasks as part of or instead of determining the computational-need condition.

At step 406, the processor determines which, if any, UE to send the computational task. In determining which, if any, UE to send the computational task, the processor may consider the one or more reporting messages from the UEs and/or the monitored status of the UEs. As part of step 406, the processor may determine, based at least in part on the status and the reporting message, a computational capacity of the user equipment. The UE may select one or more UEs with the highest computational capacity. The selection of the UEs may also be based at least in part upon a minimum threshold signal strength, a minimum threshold distance or other geographic information, etc.

At step 408, based upon a determination by the processor that it would not send the computational task to any UE, the processor may perform or delay the computational task. If there are no available UEs that meet one or more criteria for selection, the processor may determine that utno UE is available to perform the computational task. Based upon such determination, the processor may take any of various remedial actions. Examples of the remedial action that may be taken include delaying the computational task until an acceptable UE is identified, performing the omputational task by the processor, cancelling the computational task, etc.

At step 410, based upon a determination by the processor that it would send the computational task to a single UE, the processor may send the computational task to the UE. The processor may encode, encrypt, compress, or otherwise prepare the computational task for transmission. In some instances, the computational task may be a set of instructions. In some instances, the computational task may be a file or other set of data upon which a function should be performed. The processor may instruct the user equipment to perform the computational task to at least partially meet the computational-need condition that was identified in step 404.

At step 412, based upon a determination by the processor that it would send the computational task to two or more UEs, the processor may divide the computational task into a subset of computational tasks. The processor may determine how to divide the computational task into the subset of computational tasks. For example, if the first UE has a greater computational capacity that the second UE, the processor may create a first subset of the computational task that is larger (e.g., more computationally intensive) than a second subset, and send the first subset to the first UE. The processor may additionally or alternatively divide the computational task by priority, type, timeline, and other considerations. At step 414, the processor may send a first subset of the computational task to a first UE. At step 416, the processor may send a second subset of the computational task to a second UE. The processor may encode, encrypt, compress, or otherwise prepare the subsets of the computational task for transmission. In some instances, the subsets of the computational task may be a set of instructions. In some instances, the subsets of the computational task may be a file or other set of data upon which a function should be performed. The processor may instruct the respective user equipments to perform the respective subsets of the computational task to at least partially meet the computational-need condition that was identified in step 404.

It should be appreciated that in aspects, the method may further comprise establishing communication with a second user equipment, such as the above-described second UE. The method may further comprise receiving, from the second user equipment, a second reporting message indicative of a second computing capacity of the second user equipment; as well as monitoring a second status of the second user equipment. The method may further comprise determining, based at least in part on the second status and the second reporting message, a second computational capacity of the second user equipment. Thus, in these embodiments, the processor is communicating and monitoring two or more user equipments, and may select one or more of the two or more user equipments to which to assign all or a segment of the computational task.

At step 418, the processor will receive the computational result from the one or more UEs, having completed the assigned computational task. The UE may send the computational result to the processor (e.g., the distributed station or the base station) via the mobile communications network. The computational result includes or is otherwise indicative of the results of the computational task being performed by a processor at the user equipment. At step 420, the processor will implement the computational result. The processor may implement the computational result so as to at least partially meet the computational-need condition determined in step 404.

In embodiments, one or more of the above-discussed steps may be performed by the user equipment. In other embodiments, one or more of the above-discussed steps may be performed by the base station and one or more of the above-discussed steps may be performed by the user equipment. In still other embodiments, one or more of the above-mentioned steps may be performed by the distributed station. In yet still other embodiments, one or more of the above-discussed steps may be performed by the distributed station and one or more of the above-discussed steps may be performed by the user equipment.

Figure 5:
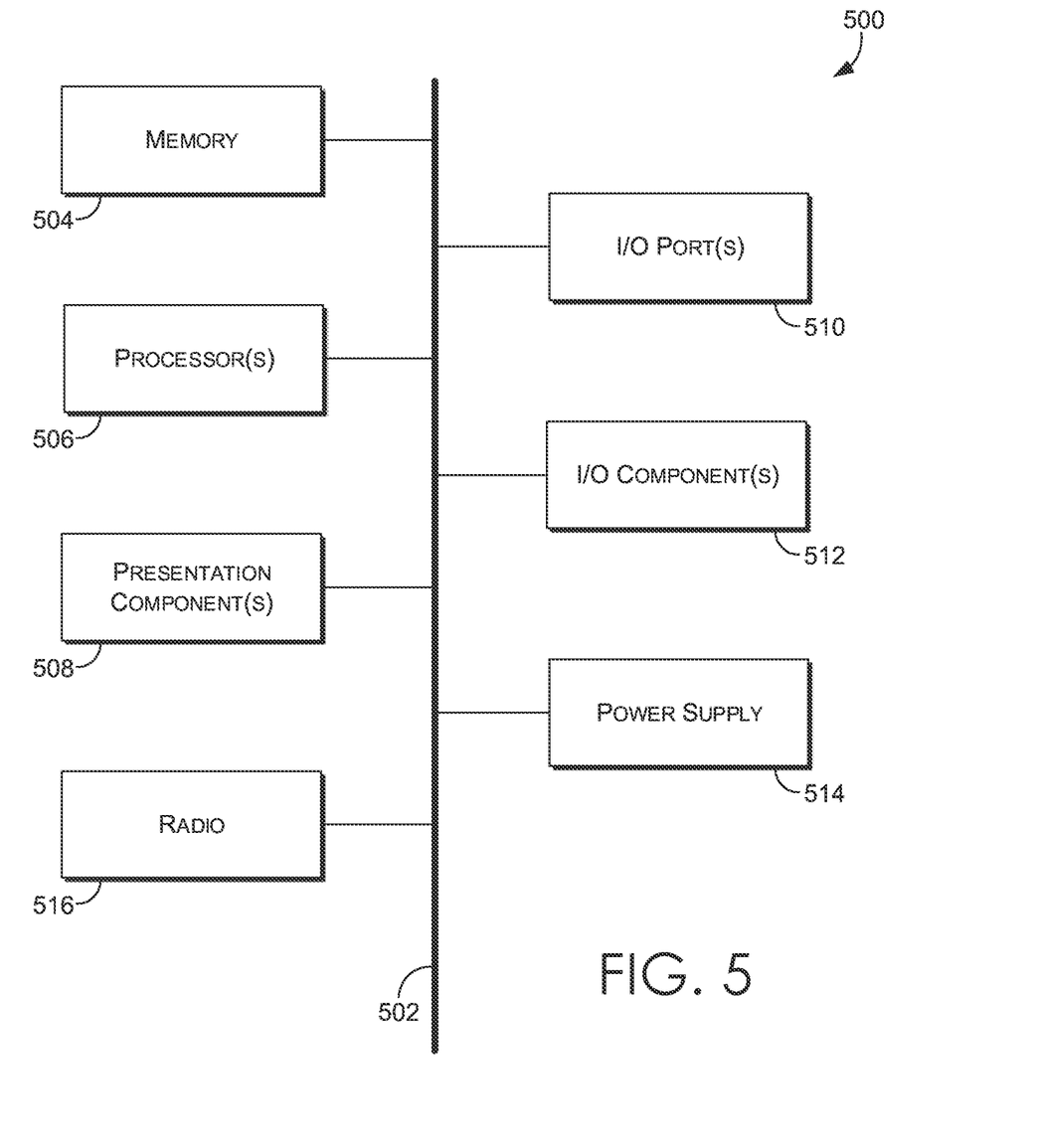
FIG. 5 is a diagram of a computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of aspects described herein. Neither should computing device 500 be interpreted as having any dependency nor requirement relating to any one or combination of components illustrated. In aspects, the computing device 500 may be a UE 104, WCD, or other user equipment, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. In aspects, the radio 516 utilizes one or more transmitters, receivers, and antennas to communicate with the wireless telecommunications network on a first downlink/uplink channel. Though only one radio is depicted in FIG. 1, it is expressly conceived that the computing device 500 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 516 might additionally or alternatively facilitate other types of wireless communications including Wi-Fi, WiMAX, LTE, 5G NR, or other VoIP communications. As can be appreciated, in various embodiments, radio 516 can be configured to support multiple technologies and/or multiple radios can be utilized to support multiple technologies. A wireless telecommunications network might include an array of devices, which are not shown so as not to obscure more relevant aspects herein. Components such as a base station 102, a communications tower, or even access points (as well as other components) can provide wireless connectivity in some embodiments.

Figure 6:
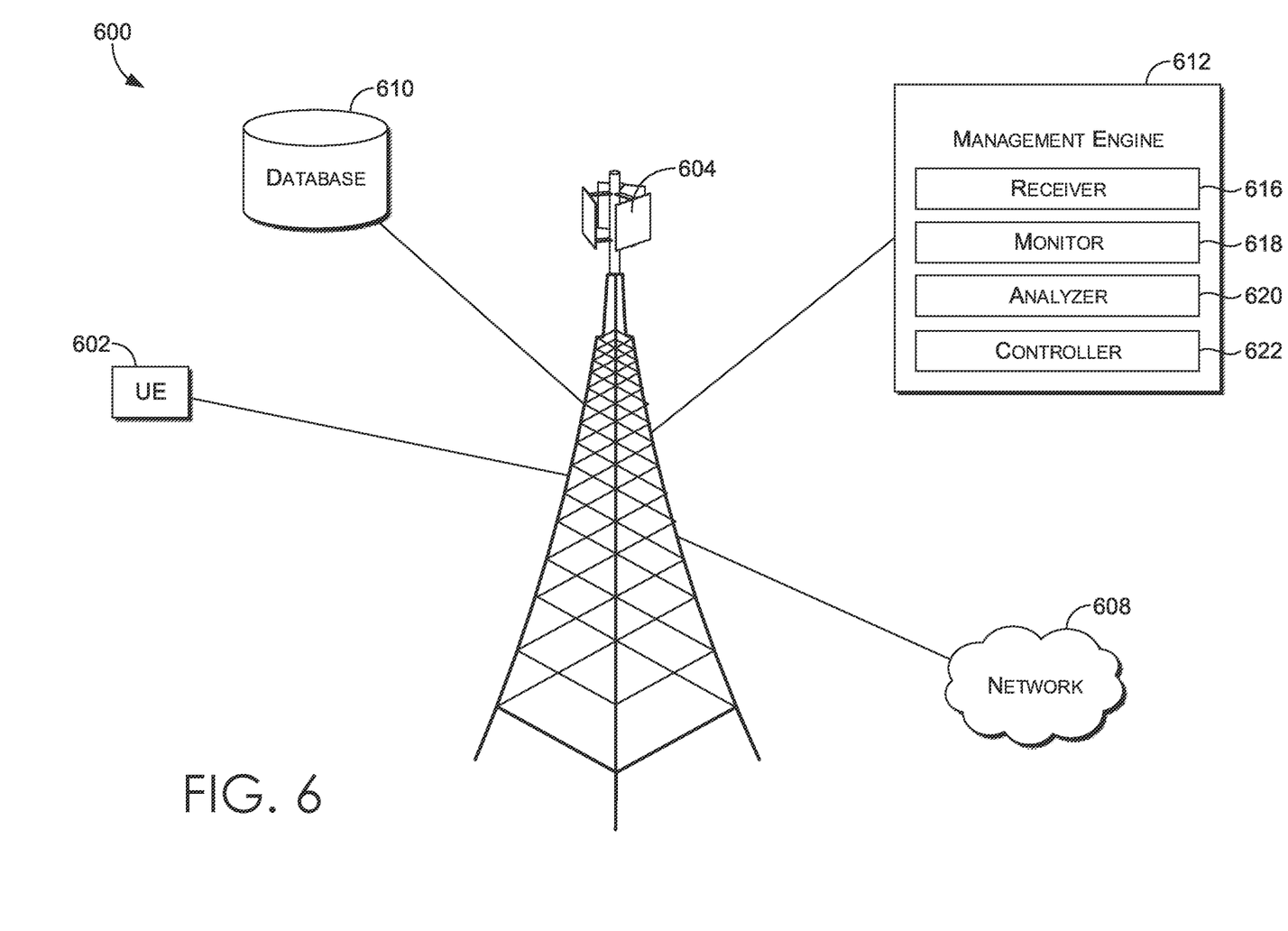
FIG. 6 illustrates a network environment in which implementations of the present disclosure may be employed.

FIG. 6 provides an exemplary network environment in which implementations of the present disclosure may be employed. Such a network environment is illustrated and designated generally as network environment 600. Network environment 600 is but one example of a suitable network environment and is not intended to suggest any limitation as to the scope of use or functionality of aspects. Neither should the network environment be interpreted as having any dependency or requirement relating to any one or combination of components illustrated.

Network environment 600 includes user equipment 602, a first node 604, network 608, database 610, and management engine 612. In network environment 600, the user equipment 602 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that wirelessly communicates via with a node of the wireless network, such as the first node 604, in order to interact with one or more components of the network 608.

In some aspects, the user equipment 602 can correspond to computing device 500 in FIG. 1. Thus, a user equipment can include, for example, a display(s), a power source(s) (e.g., a battery), a data store(s), a speaker(s), memory, a buffer(s), a radio(s) and the like. In some implementations, the user equipment 602 comprises a wireless or mobile device with which a wireless telecommunication network(s) can be utilized for communication (e.g., voice and/or data communication). In this regard, the user equipment can be any mobile computing device that communicates by way of a wireless network, for example, a 3G, 4G, 5G, or any other type of network. Further, the user equipment 602 may communicate with the node 604 on any one or more frequencies, frequency bands, channels, or the like. Though only the node 604 is depicted in FIG. 2, it should be understood that the user equipment 602 may be capable of connecting to any one or more of a plurality of nodes, using any one or more of a plurality of communication protocols, on any one or more of a plurality of frequencies.

In some cases, the user equipment 602 in network environment 600 can optionally utilize network 608 to communicate with other computing devices (e.g., a mobile device (s), a server(s), a personal computer(s), etc.) through the node 604. The network 608 may be a telecommunications network(s), or a portion thereof. A telecommunications network might include an array of devices or components (e.g., one or more base stations 102), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 608 can include multiple networks, as well as being a network of networks, but is shown in more simple form so as to not obscure other aspects of the present disclosure.

Network 608 can be part of a telecommunication network that connects subscribers to their immediate service provider. In some instances, network 608 can be associated with a telecommunications provider that provides services (e.g., voice, data, SMS) to user devices, such as user equipment 602. For example, network 608 may provide voice, SMS, and/or data services to user equipments or corresponding users that are registered or subscribed to utilize the services provided by a telecommunications provider. Network 608 can comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE,), or a 5G network.

In some implementations, the first node 604 is configured to communicate with user equipments, such as the user equipment 602 that are located within the geographical area, or cell, covered by the one or more antennas of the first node 604. Though referred to as a node for simplicity, the first node 604 may include (or be communicatively coupled to) one or more base stations 102, distributed stations, nodes, base transmitter stations, radios, antennas, antenna arrays, power amplifiers, transmitters/receivers, digital signal processors, control electronics, GPS equipment, and the like. In particular, the node 604 may transmit a downlink signal to the user equipment 602 in an effort to establish a wireless communication session. The user equipment 602 may perform a cell selection/reselection procedure wherein the user equipment 602 makes various determinations, measurements, and/or observations about one or more network parameters. If the user equipment 602 selects (or reselects) the cell comprising node 604, the user equipment 602 may, in return, attempt to communicate an uplink signal back to the node 604.

The first node 604 may be in communication with the management engine 612, which comprises various components that are utilized, in various implementations, to perform one or more methods as described herein. In some implementations, such as the one depicted in FIG. 6, the management engine 612 comprises components including a receiver 616, a monitor 618, a computational task engine 620, and a controller 622. However, in other implementations, more or less components than those shown in FIG. 6 may be utilized to carry out aspects described herein. Though shown as a separate entity, the management engine 612 may take the form of one or more software stacks, modules, applications, etc., may be executed and/or located at a single location or a plurality of locations, and may be executed by one or more network components, or may provide instructions for execution at a location remote to the management engine.

The receiver 616 of the management engine 612 is generally responsible for receiving information and/or indications from various network components and/or user equipments that may be relevant for making uplink management decisions. For example, the receiver 616 may receive a plurality of RF signals in the uplink. Said received RF signals may comprise external interference, inter-modulation interference, inter-nodal interference, thermal noise, jamming RF, uplink transmissions from a user equipment, or the like. The receiver 616 may communicate said information to one or more of the monitors 618, the computational task engine 620, or the controller 622. The monitor 618 of the management engine 612 is generally responsible for monitoring signal strength of the received RF signals in the uplink and one or more network parameters of the wireless communication links between the node 604 and the user equipment 602. The one or more network parameters may comprise a frequency, channel, frequency band, wireless communication protocol, selected cell, or the like. The monitor 618 may communicate said information to one or more of the computational task engine 620 and the controller 622.

The computational task engine 620 may receive an indication from the receiver 616 and/or the monitor 618 as to the current information related to the various UEs 602, which may include computational capacity, status, and other data. The computational task engine 620 may assign one or more computational tasks to one or more UEs 602 to be performed. The receiver 616 may receive the computational result and send such computational result to the computational task engine 620 and/or the controller 622. The controller 622 may implement or otherwise utilize the computational result so as to at least partially meet the computational need condition, such that the overall process may have taken less time and/or computational power by the base station 604 than manually performing the computational task itself would have taken. Thus, the efficiency of the overall system may be increased by utilizing the computational capacity of the one or more UEs 602.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system comprising:
   processor; and
   one or more non-transitory computer readable storage devices storing computer executable instructions that, when executed by the processor, cause the processor to:
      establish, at a base station, communication with a user equipment over a wireless telecommunications network;
      receive, from the user equipment, a reporting message indicative of a computing capacity of the user equipment;
      monitor a status of the user equipment;
      determine a computational-need condition;
      determine, based at least in part on the status and the reporting message, a computational capacity of the user equipment, wherein the status is indicative of an amount of time for which the user equipment will available;
      instruct the user equipment to perform a computational task to meet the computational-need condition;
      receive, from the user equipment, a computational result; and
      implement the computational result so as to at least partially meet the computational-need condition.

2. The system of claim 1, wherein the reporting message is indicative of at least one of the following: processing capacity, a memory storage capacity, or a network speed capacity.

3. The system of claim 1, wherein the status is indicative of at least one of a current mode of the user equipment, a current computational load, a current signal strength, a current geographic location of the user equipment, or a current speed of the user equipment.

4. The system of claim 1, wherein the computational-need condition is indicative of at least one computationally intensive task for completion.

5. The system of claim 1, wherein the step of instructing includes sending a computational task packet to the user equipment that contains at least a portion of the computational task to be completed.

6. The system of claim 1, wherein the processor is further configured to:
   establish communication with a second user equipment, wherein the second user equipment is configured to communicate by way of the wireless communications network;
   receive, from the second user equipment, a second reporting message indicative of a second computing capacity of the second user equipment;
   monitor a second status of the second user equipment;
   determine, based at least in part on the second status and the second reporting message, a second computational capacity of the second user equipment.

7. The system of claim 6, wherein the processor is further configured to determine, based at least in part on the second computational capacity, that the second user equipment is incapable of supporting the computational task.

8. The system of claim 6, wherein the processor is further configured to:
   determine, based at least in part on the second computational capacity, that the second user equipment is capable of performing a second computational task
   instruct the second user equipment to perform the second computational task to meet the computational-need condition; and
   receive, from the second user equipment, a second computational result; and
   implement the second computational result so as to at least partially meet the computational-need condition.

9. The system of claim 8, wherein the processor is further configured to determine that the computational-need condition can be satisfied by a combination of the computational task and the second computational task.

10. A method comprising:
    establishing, at a base station, communication with a user equipment over a wireless telecommunications network;
    receiving, from the user equipment, a reporting message indicative of a computing capacity of the user equipment;
    monitoring a status of the user equipment, wherein the status is indicative of an amount of time for which the user equipment will available;
    determining a computational-need condition;
    determining, based at least in part on the status and the reporting message, a computational capacity of the user equipment;

instructing the user equipment to perform a computational task to at least partially meet the computational-need condition;

receiving, from the user equipment, a computational result; and implementing the computational result so as to at least partially meet the computational-need condition.

11. The method of claim 10, wherein the reporting message is indicative of at least one of the following: processing capacity, a memory storage capacity, or a network speed capacity, and wherein the status is indicative of at least one of a current mode of the user equipment, a current computational load, a current signal strength, a current geographic location of the user equipment, a current speed of the user equipment.

12. The method of claim 10, further comprising:

establishing communication with a second user equipment;

receiving, from the second user equipment, a second reporting message indicative of a second computing capacity of the second user equipment;

monitoring a second status of the second user equipment;

determining, based at least in part on the second status and the second reporting message, a second computational capacity of the second user equipment.

13. The method of claim 12, further comprising:

determining, based at least in part on the second computational capacity, that the second user equipment is incapable of supporting the computational task.

14. The method of claim 13, further comprising:

determining, based at least in part on the second computational capacity, that the second user equipment is capable of performing a second computational task instructing the second user equipment to perform the second computational task to meet the computational-need condition; and receiving, from the second user equipment, a second computational result; and implementing the second computational result so as to at least partially meet the computational-need condition.

15. A system comprising:

processor; and one or more non-transitory computer readable storage devices storing computer executable instructions that, when executed by the processor, cause the processor to:

establish communications with a first user equipment and a second user equipment over a wireless telecommunications network;

receive, from the first user equipment, a first reporting message indicative of a first computing capacity of the first user equipment;

receive, from the second user equipment, a second reporting message indicative of a second computing capacity of the second user equipment;

monitor a first status of the first user equipment and a second status of the second user equipment;

determine a computational-need condition;

determine, based at least in part on the first status and the first reporting message, a computational capacity of the first user equipment;

determine, based at least in part on the second status and the second reporting message, a computational capacity of the second user equipment;

instruct the first user equipment to perform a computational task to meet the computational-need condition;

receive, from the first user equipment, a computational result; and implement the computational result so as to at least partially meet the computational-need condition.

16. The system of claim 15, wherein the processor is further configured to determine, based at least in part on the second computational capacity, that the second user equipment is incapable of supporting the computational task.

17. The system of claim 15, wherein the processor is further configured to:

determine, based at least in part on the second computational capacity, that the second user equipment is capable of performing a second computational task;

instruct the second user equipment to perform the second computational task to meet the computational-need condition;

receive, from the second user equipment, a second computational result; and implement the second computational result so as to at least partially meet the computational-need condition.

18. The system of claim 17, wherein the processor is further configured to divide the computational task into the computational task and the second computational task.

19. The system of claim 15, wherein the reporting message is indicative of at least one of the following: processing capacity, a memory storage capacity, or a network speed capacity, and wherein the status is indicative of at least one of a current mode of the user equipment, a current computational load, a current signal strength, a current geographic location of the user equipment, a current speed of the user equipment.

* * * * *